United States Patent [19]

O'Mahony et al.

[11] Patent Number: 5,692,035
[45] Date of Patent: Nov. 25, 1997

[54] METHOD AND APPARATUS FOR MULTIPLEXING VOICE AND DATA ON A SINGLE ANALOG-LOOP TELEPHONE LINE

[75] Inventors: Barry O'Mahony, Banks; Narjala Bhasker, Portland, both of Oreg.

[73] Assignee: Intel Corporation, Santa Clara, Calif.

[21] Appl. No.: 622,444

[22] Filed: Mar. 22, 1996

Related U.S. Application Data

[63] Continuation of Ser. No. 265,326, Jun. 24, 1994, abandoned.

[51] Int. Cl.⁶ .................................................. H04M 11/00
[52] U.S. Cl. .............................. 379/93; 379/98; 370/493
[58] Field of Search ............................... 379/93, 94, 96, 379/97, 98, 100, 92, 106, 107; 348/16, 17; 375/222, 240; 370/69.1, 125, 58.1, 110.1; 381/29-31

[56] References Cited

U.S. PATENT DOCUMENTS

| | | | |
|---|---|---|---|
| 4,512,013 | 4/1985 | Nash et al. | 370/69.1 |
| 4,644,527 | 2/1987 | Anderson et al. | 370/110.1 |
| 4,805,208 | 2/1989 | Schwartz | 379/93 |
| 5,086,453 | 2/1992 | Senoo et al. | 379/100 |
| 5,091,877 | 2/1992 | Itoh et al. | 379/92 |
| 5,200,962 | 4/1993 | Kao et al. | 375/240 |
| 5,365,516 | 11/1994 | Tsumuva et al. | 379/93 |
| 5,438,614 | 8/1995 | Rozman et al. | 379/93 |
| 5,440,585 | 8/1995 | Partridge, III | 375/222 |
| 5,452,289 | 9/1995 | Sharma et al. | 379/93 |
| 5,463,616 | 10/1995 | Kruse et al. | 379/93 |
| 5,502,727 | 3/1996 | Catanzaro et al. | 379/93 |
| 5,519,640 | 5/1996 | Ganesan et al. | 364/514 R |

OTHER PUBLICATIONS

Harry Newton, *Newton's Telecom Dictionary*, p. 611 Apr. 1994.

*Primary Examiner*—Stella Woo
*Attorney, Agent, or Firm*—Blakely, Sokoloff, Taylor & Zafman

[57] ABSTRACT

An enhanced micro-controller having multiple operating modes, including an idle mode, an analog voice mode, a digital data mode, and a simultaneous voice and data (SVD) mode, is provided to a DCE designed to support multi-modal voice and/or data calls over a single analog-loop telephone line. The enhanced micro-controller further contains control logic for establishing multiple logical connections and voice as well as data transmission protocols over these logical connections with another DCE, when switching from the analog voice mode to the SVD mode, and for multiplexing voice and data transmissions over these logical connections. During operation, the control logic transmits voice over a logical voice connection in nominally fixed intervals without error control, i.e. re-transmission for reliability. If non-voice transmission, i.e. data or information to be exchanged, is in progress, when it is time to transmit voice, and there are voice to be transmitted, the non-voice transmission is preferably suspended in favor of the voice transmission.

19 Claims, 7 Drawing Sheets

METHOD AND APPARATUS FOR MULTIPLEXING VOICE AND DATA ON A SINGLE ANALOG-LOOP TELEPHONE LINE

This is a continuation of application Ser. No. 08/265,326, filed Jun. 24, 1994, now abandoned.

BACKGROUND OF THE INVENTION

1. Field of the Invention

The present invention relates to the field of Data Communication. More specifically, the present invention relates to data circuit terminating equipments (DCEs) such as modems for transmitting voice and data over analog-loop telephone lines.

2. Background Information

Current DCEs that support transmission of both voice and data over a single analog-loop telephone line typically implement the support in one of two approaches. Under the first approach, a DCE operates in one of two switchable modes, a voice mode and a data mode, whereas under the second approach, a DCE operates in a single continuous combined voice and data mode.

More specifically, under the first approach, both the calling and answering DCEs start out in the voice mode, where analog voice signals are bypassed from the transmitting telephone coupled to one of the DCEs onto the analog-loop telephone line, and similarly from the analog-loop telephone line to the receiving telephone coupled to the other DCE. While the DCEs are in voice mode, no data are transmitted by the DCEs on behalf of data transmitting equipments (DTEs), such as computers, coupled to the DCEs at both end of the connection. To switch into the data mode, one of the DTEs would cause its DCE to transmit a predetermined signal pattern on its behalf. Upon detection of the predetermined signal pattern, the other DCE would acknowledge. If the acknowledgment is received by the initiating DCE within a predetermined time period, the DCEs would jointly establish a data transmission protocol, enter the data mode, and mute the DCE's voice path. The DTEs can now transmit data to each other through their respective DCEs and over the analog-loop telephone line. At the end of data transmission, the DTE that initiated the mode switching would cause its DCE to transmit another predetermined signal pattern on its behalf, return to the voice mode, and unmute the voice path. Likewise, upon detection of this other predetermined signal pattern, the other DCE would also forward the signal to its DTE, return to the voice mode, and unmute the voice path. Voice signals are once again bypassed from the transmitting telephone onto the telephone line, and from the telephone line to the receiving telephone.

Typically, the data transmission protocol jointly established by the calling and answering DCEs as an integral part of switching from the voice mode to the data mode is a High Level Data Link (HDLC) frame based type protocol.

Under the second approach, the DCEs always operate in a single continuous combined voice and data mode. The DCEs jointly establish a data transmission protocol at start up. The analog voice signals received from the coupled telephones are digitized by the DCEs or forwarded to the coupled DTEs for digitization. The DCEs transmit the digitized voice signals intermixed with the data received from the coupled DTEs. Conversely, the digitized voice signals received from the analog-loop telephone line are converted back into analog voice signals by the DCEs or forwarded to the coupled DTEs for conversion. The DCEs then forward the analog voice signals to the telephones.

Typically, the data transmission protocol jointly established by the calling and answering DCEs as an integral part of the initial start up of the single continuous combined voice and data mode is also a High Level Data Link (HDLC) frame based type of protocol. Except for "marking" the digitized voice to facilitate their identification and conversion back to analog voice signals, the digitized voice are otherwise handled as if they are data.

The first approach has the disadvantage that there is no voice communication between the connected parties during data transmission. Thus, DCEs implementing the first approach are really suitable only for applications where voice communication is unnecessary during data transmission or data transmission is merely required intermittently and for short durations.

The second approach has the disadvantage that the DCEs on both ends of the connection must support continuous combined voice and data mode. Therefore, for applications frequently involving "unacquainted" users, an initial phone call using "standalone" telephones directly coupled to another analog-loop telephone line must be made to establish the fact that such continuous combined voice and data call can be made between two DCE coupled telephones. Thus, DCEs implementing the second approach are really suitable only for applications involving primarily "acquainted" users.

With the continuing increase in the capabilities microprocessor based desktop computers, they are being applied to more and more applications that require simultaneous voice and data communications between two users. A particular example of these applications is personal conferencing where users at different sites cooperate orally and interactively with a shared workspace application on the creation or review of documents. Another example is remote technical support where the support engineers communicate orally with the users as well as interacting remotely with programs executing on the users' systems for diagnostic or demonstration purposes. Due to the disadvantages discussed above, neither types of DCEs serve these applications well. As a result, most users of these applications resort to two telephone lines, with one dedicated for voice communication, and the other dedicated to data communication.

Thus, it is desirable to be able to support multi-modal voice and data communication between two users over a single analog-loop telephone line that is more flexible and user friendly. U.S. patent application, Ser. No. 08/265,455, filed contemporaneously, entitled Method and Apparatus for Making a Multi-Modal Voice and/or Data Call over a single Analog-Loop Telephone Line, discloses such method and apparatus. Under the disclosed method and apparatus, at least four modes, an idle mode, an analog voice mode, a digital data mode, and a simultaneous voice and data (SVD) mode are supported.

It is further desirable then to be able to multiplex voice and data over the single analog-loop telephone line while operating in the SVD mode. As will be disclosed in more detail below, the present invention provide for such method and apparatus that advantageously achieves these and other desirable results.

SUMMARY OF THE INVENTION

The present invention advantageously achieves the desired results by providing an otherwise conventional DCE with an enhanced micro-controller having multiple operating modes, including an idle mode, an analog voice mode, a digital data mode, and a simultaneous voice and data (SVD) mode. The enhanced micro-controller further contains control logic for establishing multiple logical connections and voice as well as data transmission protocols over these logical connections with another DCE, when switching from the analog voice mode to the SVD mode, and for multiplexing voice and data transmissions over these logical connections.

During operation, the control logic transmits voice over a logical voice connection in nominally fixed intervals without error correction, i.e. no retransmission for reliability. If non-voice transmission, i.e. data or information to be exchanged, is in progress, when it is time to transmit voice, and there are voice to be transmitted, the non-voice transmission is preferably suspended in favor of the voice transmission.

Data and information to be exchanged are transmitted over a logical data connection during the remaining times with error correction, i.e. retransmission for reliability. Data to be re-transmitted for reliability are favored over new data to be transmitted, which in turn are favored over information to be exchanged.

DETAILED DESCRIPTION

In the following description for purposes of explanation, specific numbers, mate, rials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention.

Referring now to FIGS. 1a-1d, four block diagrams illustrating four embodiments of DCEs incorporating teachings of the present invention are shown. As illustrated, a DCE 18a, 18b', 18b", 18c' or 18c" in accordance to the present invention comprises an enhanced micro-controller 202 incorporating teachings of the present invention. The DCE 18a, 18b', 18b", 18c' or 18c" further comprises a universal asynchronous receiver/transmitter (UART) 201, a data pump digital signal processor 204, data equipment attachment adapter circuitry (DAA) 206, and predetermined start up signal detection circuitry 210.

Figure 1A:
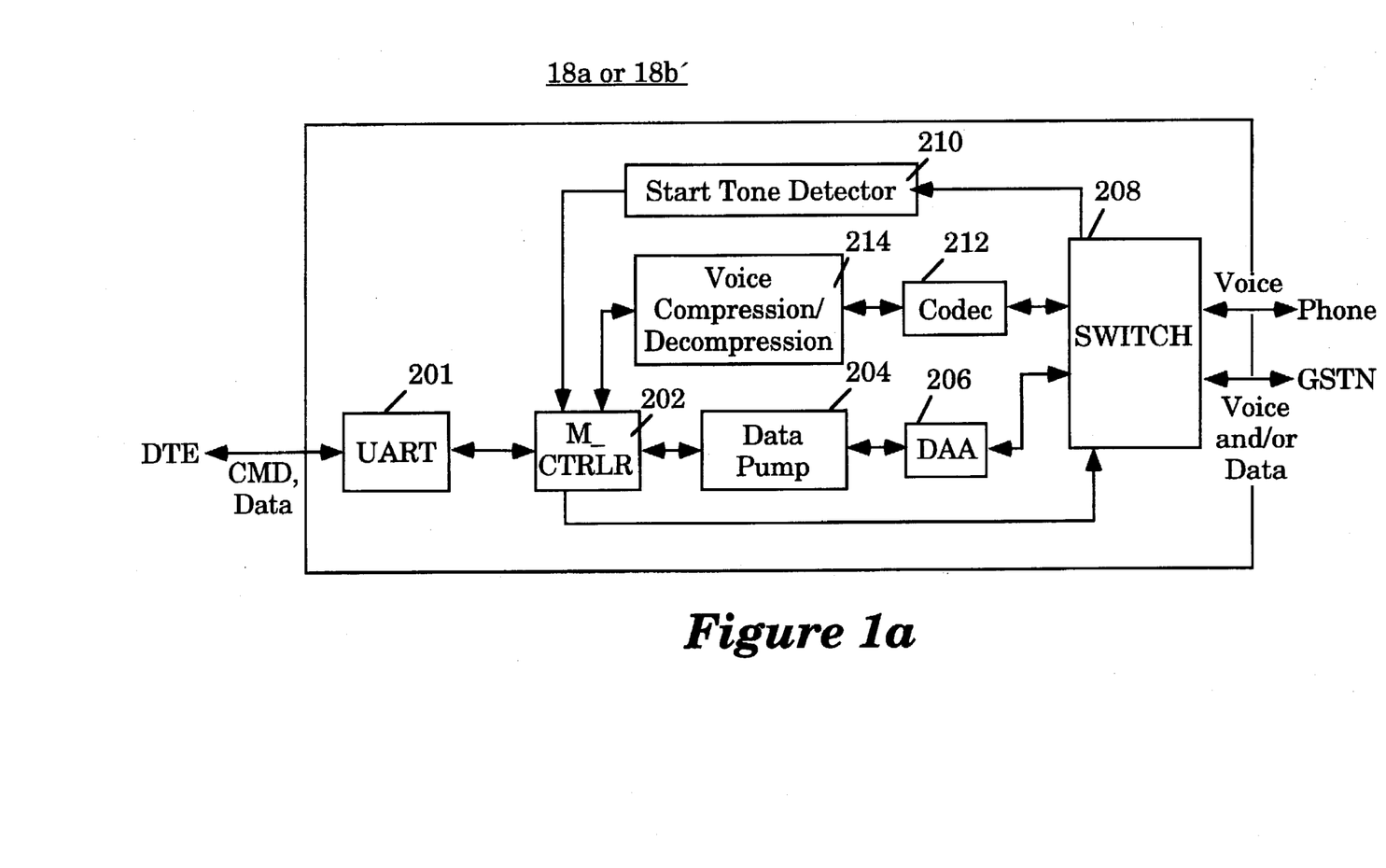
FIGS. 1a-1d illustrate four embodiments of DCEs incorporating teachings of the present invention.
Figure 1B:
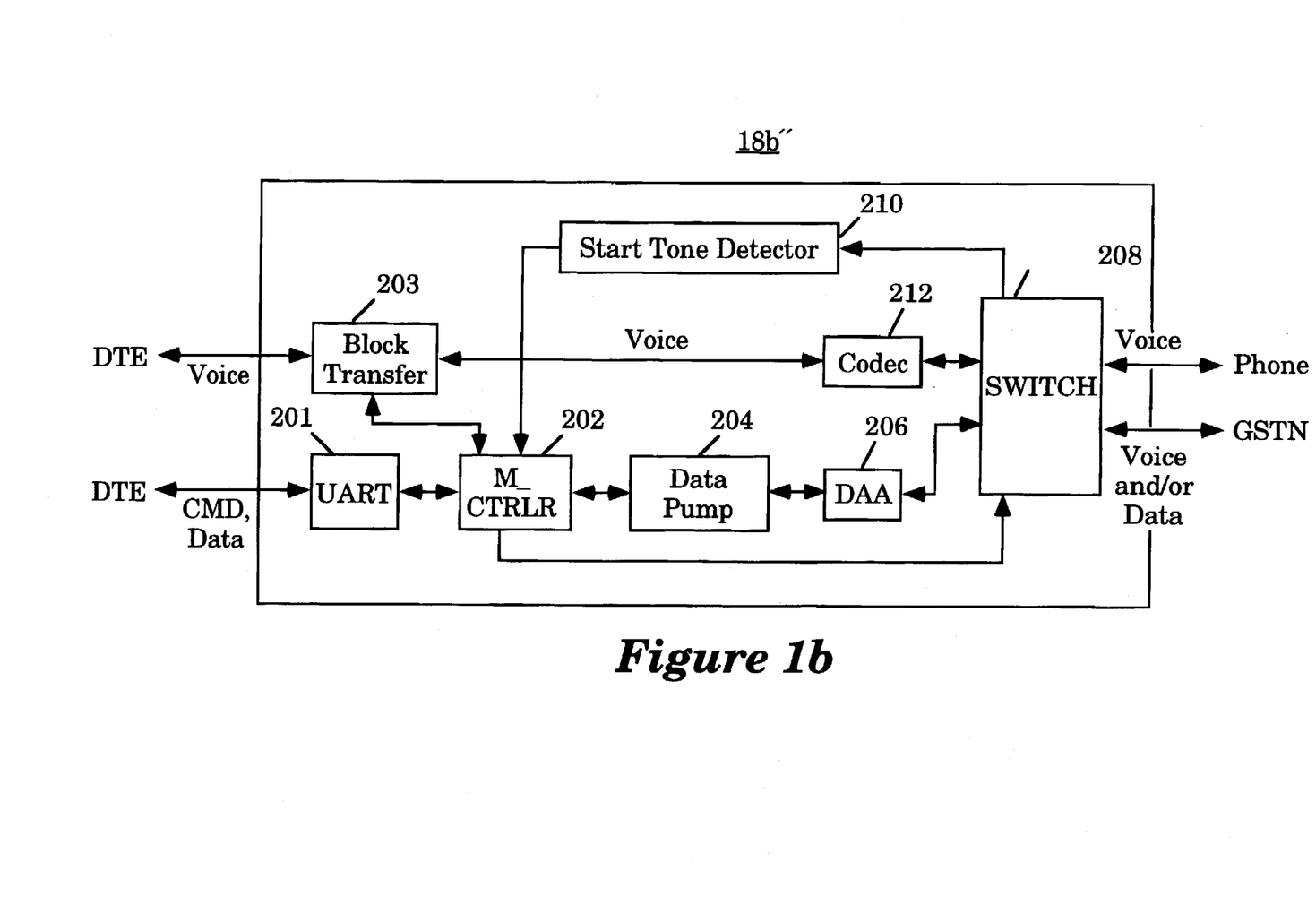

Additionally, for the first and second embodiments designed to support standalone telephones, the DCE 18a, 18b', or 18b" further comprises enhanced switching circuitry 208, and analog to digital and digital to analog conversion circuitry (CODEC) 212. For these embodiments, the enhanced switching circuitry 208 includes the conventional "loop current detector" for detecting when the standalone telephone goes off hook an starts drawing loop current, whereas the CODEC 212 includes the conventional "local phone interface" for combining the voice signals with the DC voltage for the telephone. The DCE 18a or 18b' further comprises a "local" voice compression/decompression digital signal processor 214, whereas the DOE 18b" further comprises block transfer circuitry 203. The DCE 18b" relies on the processing engine of the DTE for voice compression/decompression. The DOE 18a or 18b' may be packaged as a separate unit from the DTE or an integral part of the DTE, whereas the DCE 18b" is intended to be packaged as an integral part of the DTE.

Figure 1C:
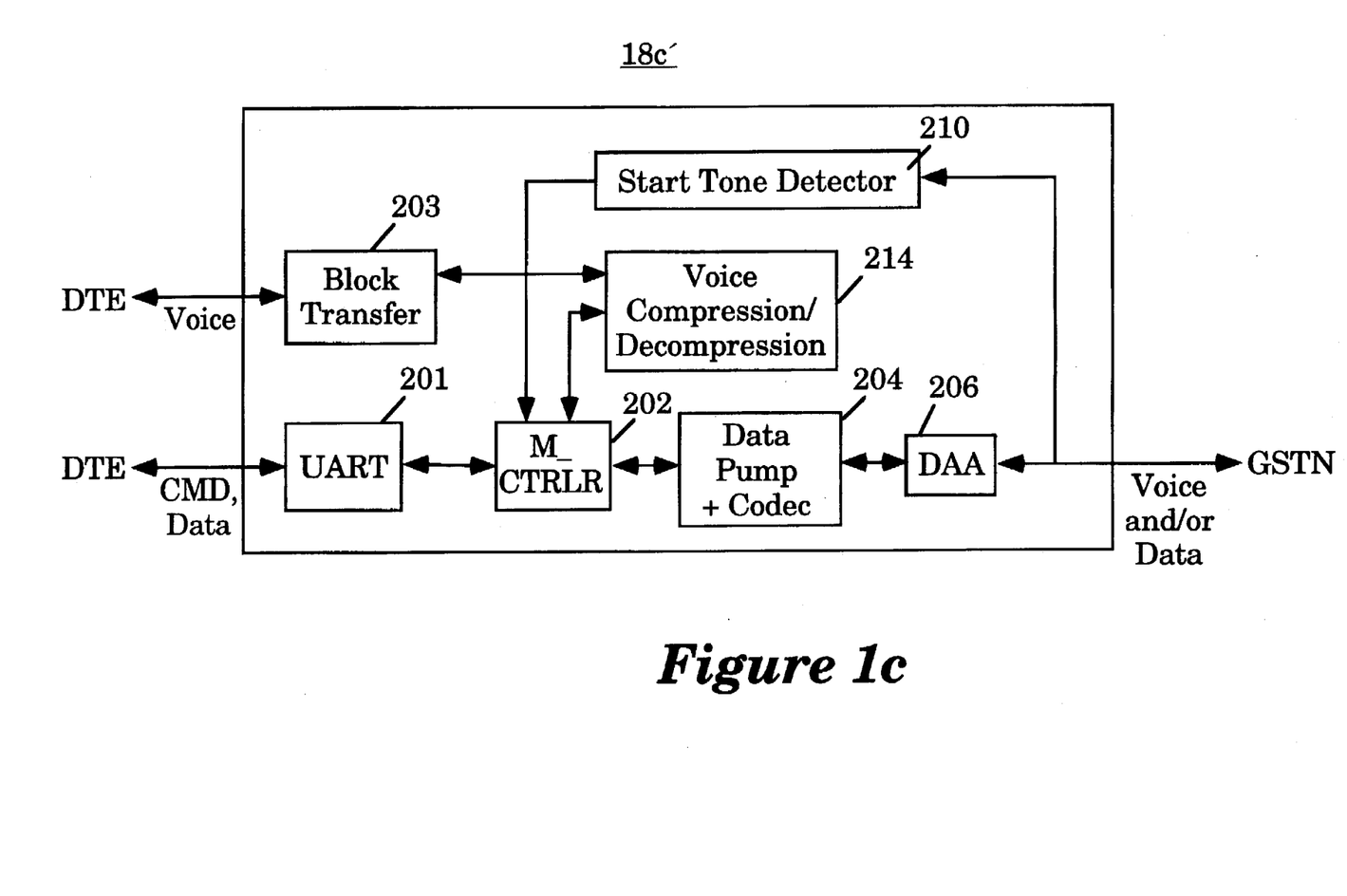
Figure 1D:
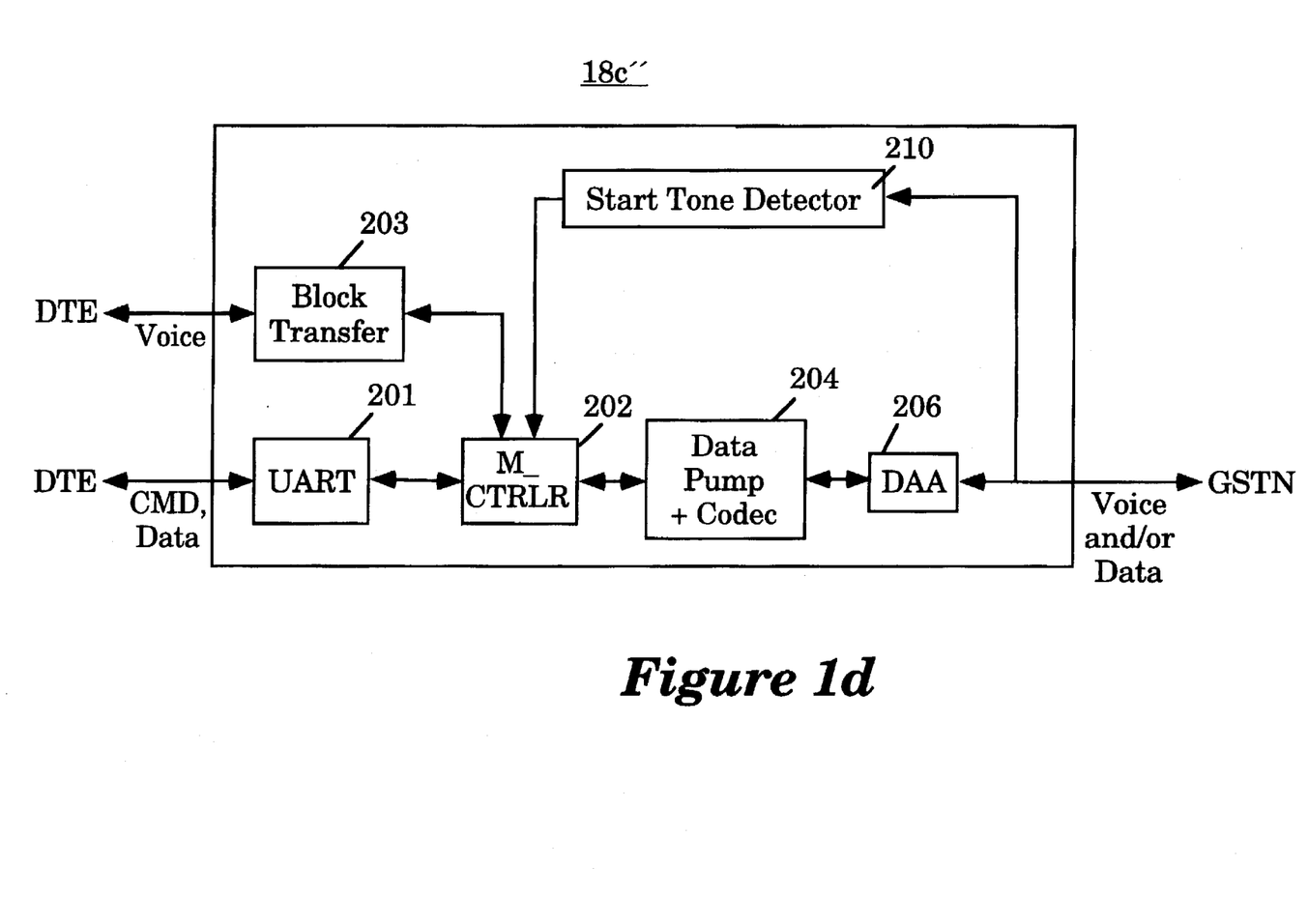

For the third and fourth embodiments designed to support integrated telephony circuitry, the data pump digital signal processor 204 of DCE 18c' or 18c" is further provided with the "CODEC" capabilities. The DCE 18c' or 18c" further comprises block transfer circuitry 203. The DCE 18c' further comprises a "local" voice compression/decompression digital signal processor 214, whereas the DCE 18c" relies on the processing engine of the DTE for voice compression/decompression. Both embodiments of the DCE 18c' and 18c" are intended to be packaged as an integral part of the DTE.

The micro-controller 202, as will be described in more details below, operates the DCE 18c, 18b', 18b", 18c', and 18c" in at least four modes, transitioning the DCE 18a, 18b', 18b", 18c', and 18c" between these operating modes responsive to local events or commands, as well as remote commands as appropriate.

The switching circuitry 208, if used, responsive to the multi-modal micro-controller 202, dynamically configures signal paths for the signals being received or to be transmitted over a coupled analog-telephone line. The signal paths for the embodiments 18c' and 18c" without the switching circuitry are preconfigured. For further description of the switching circuitry 208, see the above identified U.S. patent application, Ser. No. 08/265,455, which is hereby fully incorporated by reference.

The data pump digital signal processor 204 and the voice compression/decompression digital signal processor 21 4 are intended to represent a broad category of digital signal processors known in the art. Their constitutions and functions are well known, and will not be further described. Preferably, the data pump digital signal processor 204 is a high performance digital signal processor capable of supporting a transmission rate of 14,400 bps or higher, whereas the voice compression/decompression digital signal processor 214 is also a high performance digital signal processor capable of supporting a compression/decompression rate of 9600 bps.

The UART 201, the DAA 206, the CODEC 212, and the start up signal detection circuitry 210 are all intended to represent a broad category of these elements found in many DCEs. Similarly, the block transfer circuitry 203 is intended to represent a broad category of the element found in many computer systems. Their constitutions and functions are well known, and will not be further described.

Figure 2A:
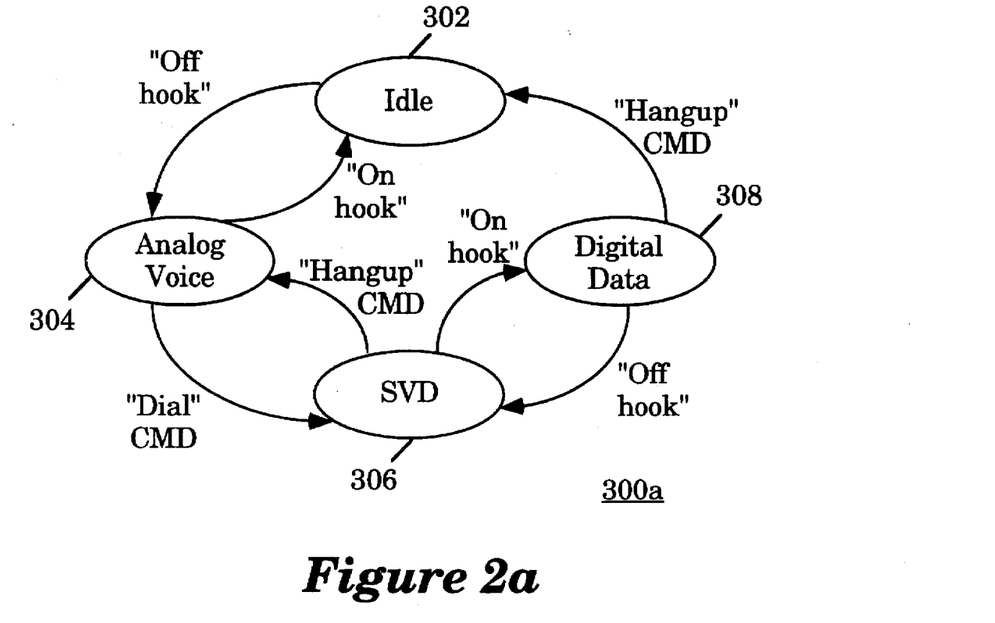
FIGS. 2a-2b illustrate the operating modes and mode transition rules of the enhanced micro-controllers of FIGS. 1a-1d.
Figure 2B:
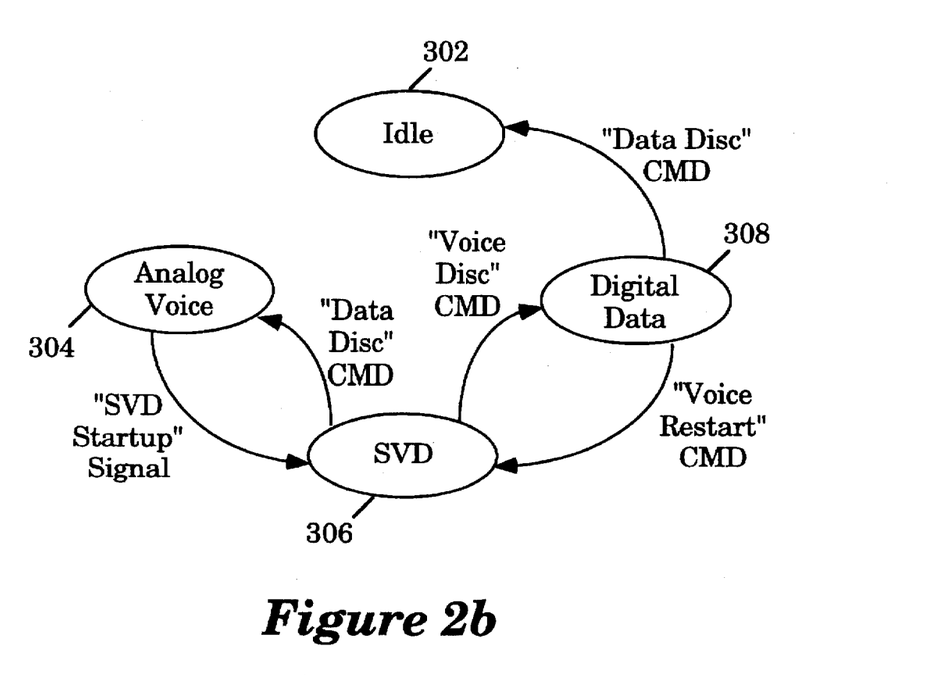

Referring now to FIGS. 2a-2b, two state diagrams illustrating the operating modes and transitional rules of the enhanced micro-controllers of FIGS. 1a-1d are shown. As illustrated, the enhanced micro-controller 202, responsive to local events or commands as well as remote commands, controls the operation of the DCE 18a, 18b', 18b", 18c', or 18c" in one of four modes, an idle mode 302, an analog voice mode 304, a digital data mode 308, and a simultaneous voice and data (SVD) mode 306.

In particular, during operation, as illustrated in FIG. 2a, from the analog voice mode 304, the micro-controller 202 of either a call originating or a call responding DCE 18a, 18b', 18b", 18c', or 18c" either returns the DCE 18a, 18b', 18b", 18c', or 18c" to the idle mode 302, upon detection of a local telephone being returned to an "on hook" condition from an "off hook" condition; or places the DCE 18a, 18b', 18b", 18c', or 18c" in the SVD mode 306, upon receipt of a "dial" command from a local DTE, and operates the DCE 18a, 18b', 18b", 18c', or 18c" accordingly. Under the SVD mode 306, the micro-controller 202 causes digitized voice as well as data to be exchanged with the other DCE 18a–18c at the other end of the analog-loop telephone line.

Either the call originating or the call responding DCE 18a, 18b', 18b", 18c', or 18c" may receive the "dial" command from the local DTE. In other words, either the call originating or the call responding DCE 18a, 18b', 18b", 18c', or 18c" may initiate transitioning the call from the analog voice mode 304 to the SVD mode 306.

Additionally, during operation, as illustrated by FIG. 2b, from the analog voice mode 304, the micro-controller 202 of either the call originating or the call responding DCE 18a, 18b', 18b", 18c', or 18c" places the DCE 18a, 18b', 18b", 18c', or 18c" in the SVD mode 306, upon detection of receiving a predetermined "start up" signal pattern from the other DCE 18a, 18b', 18b", 18c', or 18c" at the other end of the analog-loop telephone line connection, and operates the DCE 18a, 18b', 18b", 18c', or 18c" accordingly. Since either the call originating or the call responding DCE 18a, 18b', 18b", 18c', or 18c" may initiate the mode transition, the predetermined "start up" signal pattern receiving DCE 18a, 18b', 18b", 18c', or 18c" may be either the call originating or the call responding DCE 18a, 18b', 18b", 18c', or 18c"

For the embodiments illustrated in FIGS. 1a–1b, the "loop current detector" of the switching circuitry 208 is also used to detect the "on hook" and "off hook" conditions of the standalone telephone 20a. For the embodiments illustrated in FIGS. 1c–1d, the DTE simulates the "on hook" and "off hook" conditions of the integrated telephony circuitry 20b.

The manner in which the "dial" command is provided to the call originating or the call responding DCE 18a, 18b', 18b", 18c', or 18c" is protocol dependent. For example, under Telecommunication Industry Association (TIA) and Electronic Industry Association (EIA) 602 protocol, the "dial" command is provided by the "ATD" modem command.

The predetermined "start up" signal pattern unambiguously identifies to the mode transition responding DCE 18a, 18b', 18b", 18c', or 18c", the mode transition initiating DCE's desire to transition the call from the analog voice mode 304 to the SVD mode 306. The predetermined "start up" signal pattern is also protocol dependent. For examples, the predetermined "start up" signal pattern may be defined using International Telecommunication Union—Technical Standardization Sector (ITU-T) Recommendation V.25 or Draft Recommendation V.8 (see the corresponding ITU-T Recommendations for further details). As a further example, the predetermined "start up" signal pattern may be based on Bell Communication Research's (Bellcore) Analog Display Services Interface (ADDS) Customer Premises Equipment (CPE) Alerting Signal (see Bellcore publications TR-NWT-000030 and TR-NWT-001273 for further details).

In one embodiment, as will be described in more details below, the other DCE 18a, 18b', 18b", 18c', or 18c" confirms its support for SVD mode operation. Upon confirmation, the mode transition initiating and responding DCEs 18a, 18b', 18b", 18c', or 18c" jointly establish multiple logical connections, and voice and data transmission protocols over these multiple logical connections. Upon establishing the logical connections and the transmission protocols, preferably, as will be also described in more detail below, the mode transition initiating as well as the responding DCE 18a, 18b', 18b", 18c', or 18c" multiplex voice and data onto the single analog-loop telephone line. Preferably, voice are transmitted without error correction at predetermined desired fix time intervals, whereas data are transmitted with error correction in between the nominally fixed time intervals. Preferably, multiple blocks of sampled voice are transmitted for each transmission.

Voice are preferably transmitted without error correction, i.e. retransmission for reliability, because voice are "real time data". Frequent erroneous retransmission would give an user perception of echo or poor quality. Furthermore, dropped voice are typically repeated by the user anyway. The time duration between two voice transmissions are predetermined based on desired voice quality, principally but not exclusively, an users perception of voice delay.

For further description of the other non-SVD operating modes, the manners in which the DCE is operated in each of the other non-SVD operating modes, and other operating mode transitions, see all the above identified and incorporated by reference U.S. patent application, Ser. No. 08/265,455.

Figure 3:
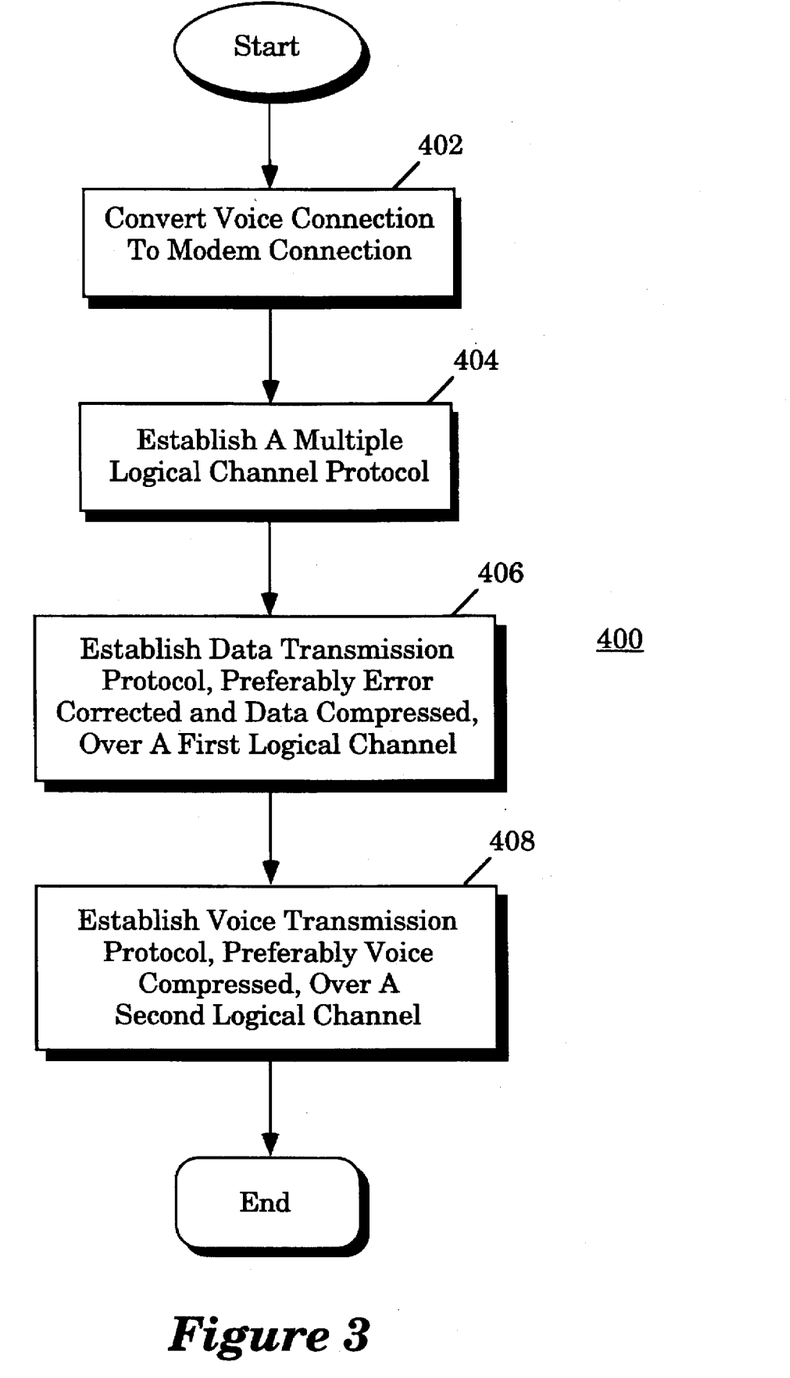
FIG. 3 illustrates the method steps employed by the enhanced micro-controllers of FIGS. 1a-1d for converting a call from the analog voice mode to the simultaneous voice and data mode.

Referring now to FIG. 3, a block diagram illustrating the method steps of the present invention performed by the DCEs for converting a call from the analog voice mode to the SVD mode is shown. As illustrated, the mode transition initiating and responding DCEs 18a, 18b', 18b", 18c', or 18c" first cooperate to convert the voice connection to a modem connection, block 402. Next, the mode transition initiating and responding DCEs 18a, 18b', 18b", 18c', or 18c" then cooperate to establish a multiple logical channel protocol for the modem connection, block 404. The multiple logical channel protocol should have at least two logical channels, one for voice transmission and one for data transmission. Upon establishing the multiple logical channel protocol, the mode transition initiating and responding DCEs 18a, 18b', 18b", 18c', or 18c" cooperate to establish a data transmission protocol for the logical data channel(s), block 406. Preferably, as described earlier, the data transmission protocol is error corrected, and data compressed. Similarly, the mode transition initiating and responding DCEs 18a, 18b', 18b", 18c', or 18c" cooperate to establish a voice transmission protocol for the logical voice channel(s), block 408. Preferably, also as described earlier, the voice transmission protocol is voice compressed, but not error corrected. Voice are transmitted at predetermined desired nominally fixed intervals, and multiple blocks of sampled voice are transmitted for each transmission. Although the present invention is being described with the data transmission protocol being jointly established before the voice transmission protocol, the present invention may be practiced with the order reversed.

In one embodiment, the mode transition initiating and responding DCEs 18a, 18b', 18b", 18c', or 18c" use the predetermined "start up" signal pattern and a predetermined "confirmation" to convert the voice connection to a modem connection, block 402. Then, the mode transition initiating and responding DCEs 18a, 18b', 18b", 18c', or 18c" jointly use V.42 detection phase to establish the multiple logical channel connection, block 404. Next, the "calling" and "answering" DCEs 18a, 18b', 18b", 18c', or 18c" jointly use V.42's protocol phase to establish the data transmission protocol for the logical data channel, block 406. Finally, the "calling" and "answering" DCEs 18a, 18b', 18b", 18c', or 18c" also jointly use V.42's protocol phase to establish the voice transmission protocol for the logical voice channel, block 408. The establishment of the voice transmission protocol includes jointly negotiating a voice compression/decompression algorithm for the voice transmission protocol, and determining a voice blocking factor based on the negotiated voice compression/decompression algorithm for the voice transmission protocol.

For further description of converting a multi-modal voice and/or data call from the analog voice mode to the SVD mode, including the determination of voice blocking factor, see U.S. patent application, Ser. No. 08/265,314, entitled Method and Apparatus for Automatically Converting From an Analog Voice Mode to a Simultaneous Voice And Data Mode . . . for a Multi-Modal Voice and/or Data Call over a Single Analog-Loop Telephone Line, which is hereby fully incorporated by reference.

Figure 4:
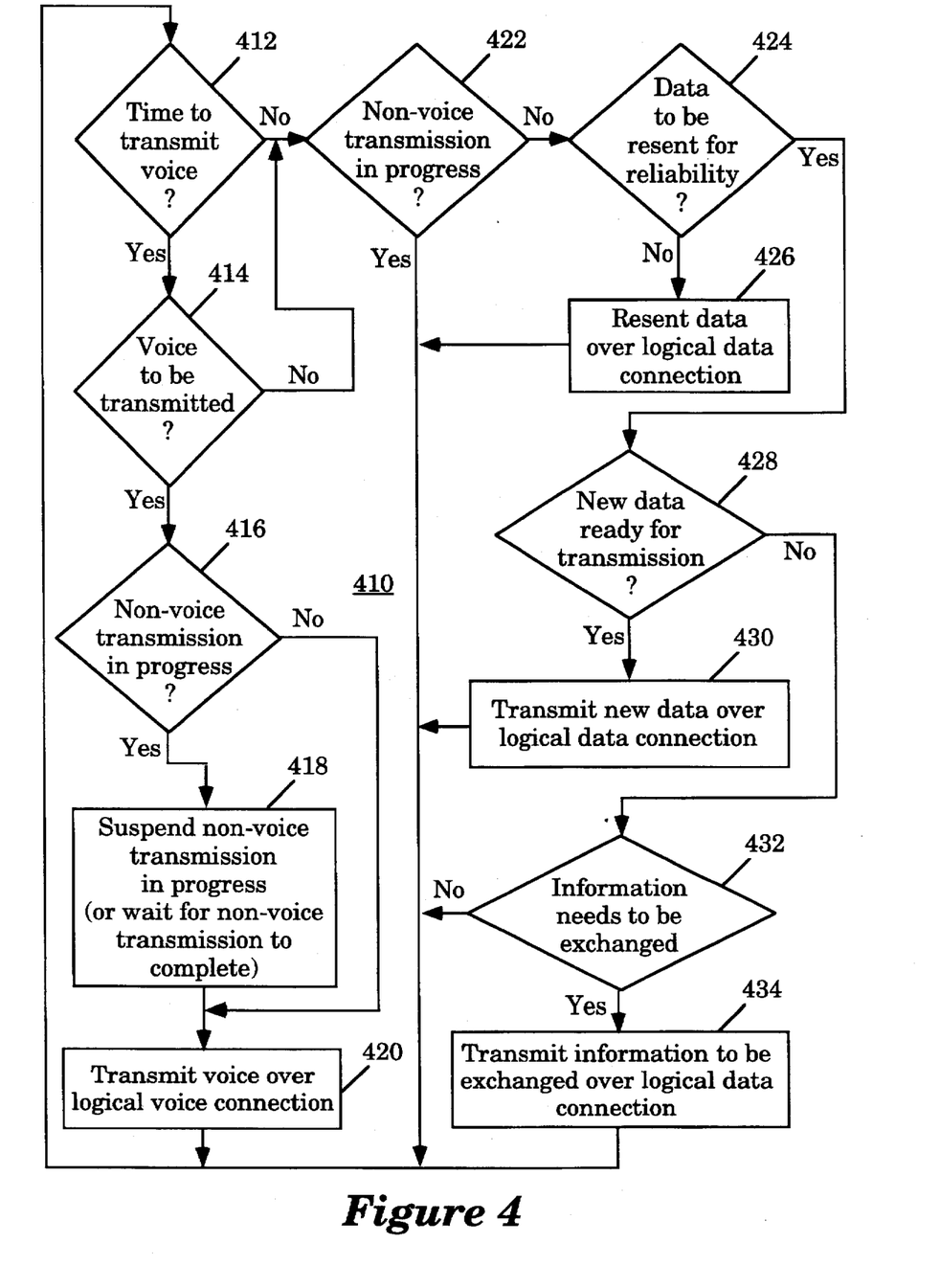
FIG. 4 illustrates the method steps of the present invention for multiplexing voice and data over the logical voice and data connections.

Referring now to FIG. 4, a block diagram illustrating the method steps of the present invention for multiplexing voice and data over the multiple logical connections is shown. As illustrated, the micro-controller 202 continuously monitors and determines whether it is time to transmit voice, block 412. If it's time for voice transmission, the micro-controller 202 further determines whether there are voice to be transmitted, block 414. If there are voice to be transmitted, the micro-controller 202 further determines whether there are non-voice transmission in progress, i.e. data or information to be exchanged, block 416. In one embodiment, if non-voice transmission is in progress, the non-voice transmission is suspended, step 418. Alternatively, the micro-controller 202 may be implemented to wait for the end of the non-voice transmission. Thus, if there is no non-voice transmission in progress, or after suspending the non-voice transmission, or waiting for the non-voice transmission to be completed, voice are transmitted over the logical voice connection, block 420.

If it is not time to transmit voice or if it is time to transmit voice but there are no voice to be transmitted, the micro-controller 202 further determines if non-voice transmission is in progress, block 422. If non-voice transmission is in progress, the micro-controller 202 returns to block 412.

On the other hand, if there is no non-voice transmission in progress, the micro-controller 202 determines if data are to be re-transmitted for reliability, block 424. In other words, acknowledgment of previously transmitted data have not been received within a predetermined time interval. If data are to be re-transmitted for reliability, the micro-controller 202 retransmits the data as specified in ITU-T Recommendation V.42, block 426.

If there is no data requiring re-transmission for reliability, the micro-controller 202 determines if there are new data ready for transmission, block 428. If there are new data ready for transmission, the micro-controller 202 transmits the new data, block 430.

Lastly, if there is no new data to be transmitted, the micro-controller 202 determines if there are information to be exchanged with the cooperating DCE, block 432. If there are information to be exchanged, the micro-controller 202 transmits the information to be exchanged, block 432.

In other words, data re-transmission for reliability is favored over transmission of new data, and transmission of new data is favored over transmission of information to be exchanged between the cooperating DCEs.

In the above described V.42 embodiment, voice are transmitted with UI frames with the data link connection identifier (DLCI) set to the logical voice connection. Data are transmitted and re-transmitted with numbered information (I) frames with the DLCI set to the logical data connection. When suspending data transmission, the I frame is completed as soon as possible by sending the terminating Frame Check Sequence octets and HDLC flad bit pattern.

Multiplexing the compressed voice and data in the manner described using the procedures detailed in the ITU-T Recommendation V.42 allows the micro-controllers 202 to enable or disable the logical connections, and to negotiate parameters to be performed using standard mechanisms. For instance, SABME and DISC frames allow the channels to be activated and deactivated, and XID frames allow parameters to be negotiated.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. An improved micro-controller of a data circuit terminating equipment (DCE), wherein the improvements comprise:

operating logic for transmitting voice in accordance to a voice protocol over an analog-loop telephone line at nominally fixed time intervals, using unnumbered information (UI) frames of a frame based transmission protocol that provides for multiple logical channels, and identifying the voice transmissions as being intended for a first of the logical channels by settinfi a data link connection identifier (DLCI) of each of the UI frames to the first logical channel's identification value, and transmitting either data or information to be exchanged with a cooperating DCE at the other end of the telephone line over the same telephone line when not transmittinfi voice, using numbered information (I) frames of the same frame based transmission protocol, and identifying the non-voice transmissions as being intended for a second of the logical channels by setting the DLCI of each of the I frames to the second logical channel's identification value, while operating the DCE in a simultaneous voice and data (SVD) mode of operation.

2. The improved micro-controller of claim 1, wherein the operating logic transmits data or information to be exchanged with error correction, but transmits voice in accordance to the voice protocol without error correction to improve quality perception of the voice transmissions.

3. The improved micro-controller of claim 1, wherein the operating logic interrupts any non-voice transmission in progress if it is time to transmit voice and there are voice ready to be transmitted.

4. The improved micro-controller of claim 1, wherein the operating logic waits for non-voice transmission in progress to complete before transmitting voice, even when it is time to transmit voice and there are voice ready to be transmitted.

5. The improved micro-controller of claim 1, wherein the operating logic favors data re-transmission for reliability over new data ready for transmission during the time between voice transmissions.

6. The improved micro-controller of claim 1, wherein the operating logic favors new data ready for transmission over information to be exchanged between the cooperating DCEs during the time between voice transmissions.

7. An improved data circuit terminating equipment (DCE), wherein the improvements comprise:

(a) a micro-controller having operating logic for operating the DCE in a simultaneous voice and data (SVD) mode, the operating logic, while operating the DCE in the SVD mode, transmits voice at nominally fixed time intervals, in accordance to a voice protocol over an analog-loop telephone line, using unnumbered information (UI) frames of a frame based transmission protocol that provides for multiple logical channels, and identifying the voice transmissions as being intended for a first of the logical channels by setting a data link connection identifier (DLCI) of each of the UI frames to the first logical channel's identification value, and transmitting either data or information to be exchanged with a cooperating DCE at the other end of the telephone line over the same telephone line when not transmitting voice, using numbered information (I) frame of the same frame based transmission protocol, and identifying the non-voice transmissions as intended for a second of the logical channels by setting the DLCI of each numbered information frames to the second logical channel's identification value.

8. The improved DCE of claim 7, wherein the operating logic transmits data or information to be exchanged with error correction, but transmits voice in accordance to the voice protocol without error correction to improve quality perception of the voice transmissions.

9. The improved DCE of claim 7, wherein the operating logic interrupts any non-voice transmission in progress if it is time to transmit voice and there are voice ready to be transmitted.

10. The improved DCE of claim 7, wherein the operating logic waits for non-voice transmission in progress to complete before transmitting voice, even when it is time to transmit voice and there are voice ready to be transmitted.

11. The improved DCE of claim 7, wherein the operating logic favors data retransmission for reliability over new data ready for transmission during the time between voice transmissions.

12. The improved DCE of claim 7, wherein the operating logic favors new data ready for transmission over information to be exchanged between the cooperating DCEs during the time between voice transmissions.

13. A method for multiplexing voice and data over an analog-loop telephone line by a data circuit terminating equipment (DCE), the method comprising the steps of:

(a) transmitting voice at nominally fixed time intervals, in accordance to a voice protocol over the telephone line by a microcontroller, using unnumbered information (UI) frames of a frame based transmission protocol that provides multiple logical channels, and identifying the voice transmissions as being intended for a first of the logical channels by setting a data link connection identifier of each of the UI frames to the first logical channel's identification value; and (b) transmitting either data or information to be exchanged with a cooperating DCE at the other end of the telephone line over the same telephone line, by the microcontroller, when not transmittin.q voice, using numbered information (I) frames the same frame based transmission protocol, and identifying the non-voice transmissions as being intended for a second of the logical channels by setting the DLCI of each of the I frames to the second logical channel's identification value.

14. The improved method of claim 13, wherein the method further comprises the step of (c), performed before steps (a) and (b), determining the time intervals for voice transmission based on a voice blocking factor and desired performance throughput by the microcontroller.

15. The improved method of claim 13, wherein step (b) includes transmitting data or information to be exchanged with error correction, but step (a) includes transmitting voice in accordance to the voice protocol without error correction by the microcontroller to improve quality perception of the voice transmissions.

16. The improved method of claim 13, wherein step (a) includes interrupting any non-voice transmission in progress if it is time to transmit voice and there are voice ready to be transmitted by the microcontroller.

17. The improved method of claim 13, wherein step (a) includes waiting for any non-voice transmission in progress to be completed before transmitting voice, even it is time to transmit voice and there are voice ready to be transmitted by the microcontroller.

18. The improved method of claim 13, wherein step (b) includes favoring data re-transmission for reliability over newdata ready for transmission during the time between voice transmissions by the microcontroller.

19. The improved method of claim 13, wherein step (b) includes favoring new data ready for transmission over information to be exchanged between the cooperating DCEs during the time between voice transmissions by the microcontroller.

* * * * *